United States Patent [19]
Kurasako et al.

[11] Patent Number: 5,379,868
[45] Date of Patent: Jan. 10, 1995

[54] DISC BRAKING DEVICE WITH AUTOMATIC BOOST

[75] Inventors: Ryoichi Kurasako, Gotenba; Hidetoshi Shimizu, Mishima, both of Japan

[73] Assignee: Toyota Jidosha Kabushiki Kaisha, Aichi, Japan

[21] Appl. No.: 46,990

[22] Filed: Apr. 16, 1993

[30] Foreign Application Priority Data

Apr. 16, 1992 [JP] Japan ................. 4-096693

[51] Int. Cl.$^6$ ............................ B60T 13/02
[52] U.S. Cl. ...................... 188/72.2; 188/346
[58] Field of Search .......... 188/340, 141, 140 A, 188/70 B, 72.2, 842; 303/112

[56] References Cited

U.S. PATENT DOCUMENTS

| | | | |
|---|---|---|---|
| 3,283,860 | 11/1966 | Watanabe | 188/346 |
| 3,537,759 | 11/1970 | DuBois | 303/112 |
| 3,700,075 | 10/1972 | Mortimer et al. | 188/346 |
| 4,865,164 | 9/1989 | Kaneda | 188/346 |
| 5,036,960 | 8/1991 | Schenk et al. | 188/72.2 |
| 5,168,966 | 12/1992 | Thioux et al. | 188/346 |

FOREIGN PATENT DOCUMENTS

| | | |
|---|---|---|
| 459855A1 | 5/1991 | European Pat. Off. . |
| 2077504 | 10/1971 | France . |
| 1530571 | 1/1965 | Germany . |
| 58-188746 | 11/1983 | Japan . |
| 90/06868 | 6/1990 | WIPO . |

*Primary Examiner*—Matthew C. Graham
*Attorney, Agent, or Firm*—Oliff & Berridge

[57] ABSTRACT

A braking device for an automotive vehicle having a master cylinder to be operated by depression of a brake pedal for producing master cylinder pressure and a wheel brake assembly movably mounted to a road wheel to be operated by the master cylinder pressure applied thereto for applying a braking force to the road wheel in accordance with the depression force of the brake pedal. The braking device includes a hydraulic servo unit mounted on an axle housing of the road wheel and operatively connected to the wheel brake assembly for generating a servo-pressure in a predetermined relationship with the braking force in response to movement of the wheel brake assembly and a hydraulic control device arranged to apply the servo-pressure to the wheel brake assembly when the servo-pressure does not increase in a predetermined relationship with a increase of the master cylinder pressure.

11 Claims, 4 Drawing Sheets

DISC BRAKING DEVICE WITH AUTOMATIC BOOST

BACKGROUND OF THE INVENTION

1. Field of the Invention

The present invention relates to a braking device for automotive vehicles which is designed to apply a braking force to the road wheels of tile vehicle in a predetermined relationship with a depression force applied to a brake pedal.

2. Discussion of the Prior Art

In Japanese Patent Laid-open Publication No. 58-188746, there has been proposed a braking device of the type which includes a pressure sensor for detecting a depression Force applied to a brake pedal and a speed sensor for detecting a rotational speed of a road wheel, wherein a brake booster assembled with a master cylinder is operated in accordance with the detected depression force of the brake pedal and a deceleration of the vehicle calculated on a basis of the detected rotational speed of the road wheel. The braking device is effective to cause a desired deceleration of the vehicle in accordance with the depression force of the brake pedal even if the dynamic frictional coefficient of lining pads of the applied disc brake assembly decreases due to an error in manufacturing process of the brake assembly or rise of the temperature of the brake assembly.

In operation of the braking device, however, the deceleration of the vehicle is calculated on a basis of the detected rotational speed of the road wheel. For this reason, if the vehicle passes over a projection or recess on the travel road in braking operation, the operation of the brake booster will be controlled to decrease the braking force applied to the road wheel. As a result, the braking force becomes insufficient after the vehicle has passed over the projection or recess on the travel road.

SUMMARY OF THE INVENTION

It is, therefore, a primary object of the present invention to provide a braking device for automotive vehicles capable of rollably maintaining the braking force applied to the road wheels in accordance with the depression on force of the brake pedal even if the vehicle passes over a projection or recess on the travel road.

According to the present invention, the primary object is accomplished by providing a braking device for an automotive vehicle having a master cylinder to be operated by depression of a brake pedal for producing master cylinder pressure and a wheel brake assembly movably mounted to a road wheel to be operated by the master cylinder pressure applied thereto for applying a braking force to the road wheel in accordance with the depression force of the brake pedal, which braking device comprises a hydraulic servo unit mounted on the road wheel and operatively connected to the wheel brake assembly for generating a servo-pressure in a predetermined relationship with the braking force in response to movement of the wheel brake assembly; and a hydraulic control device arranged to apply the servo-pressure to the wheel brake assembly when the servo-pressure does not increase in a predetermined relationship with an increase of the master cylinder pressure,

BRIEF DESCRIPTION OF THE DRAWINGS

Other objects, features and advantages of the present invention will be more readily appreciated from the following detailed description of a preferred embodiment thereof when taken together with the accompanying drawings, in which.

DESCRIPTION OF THE PREFERRED EMBODIMENT

Figure 1:
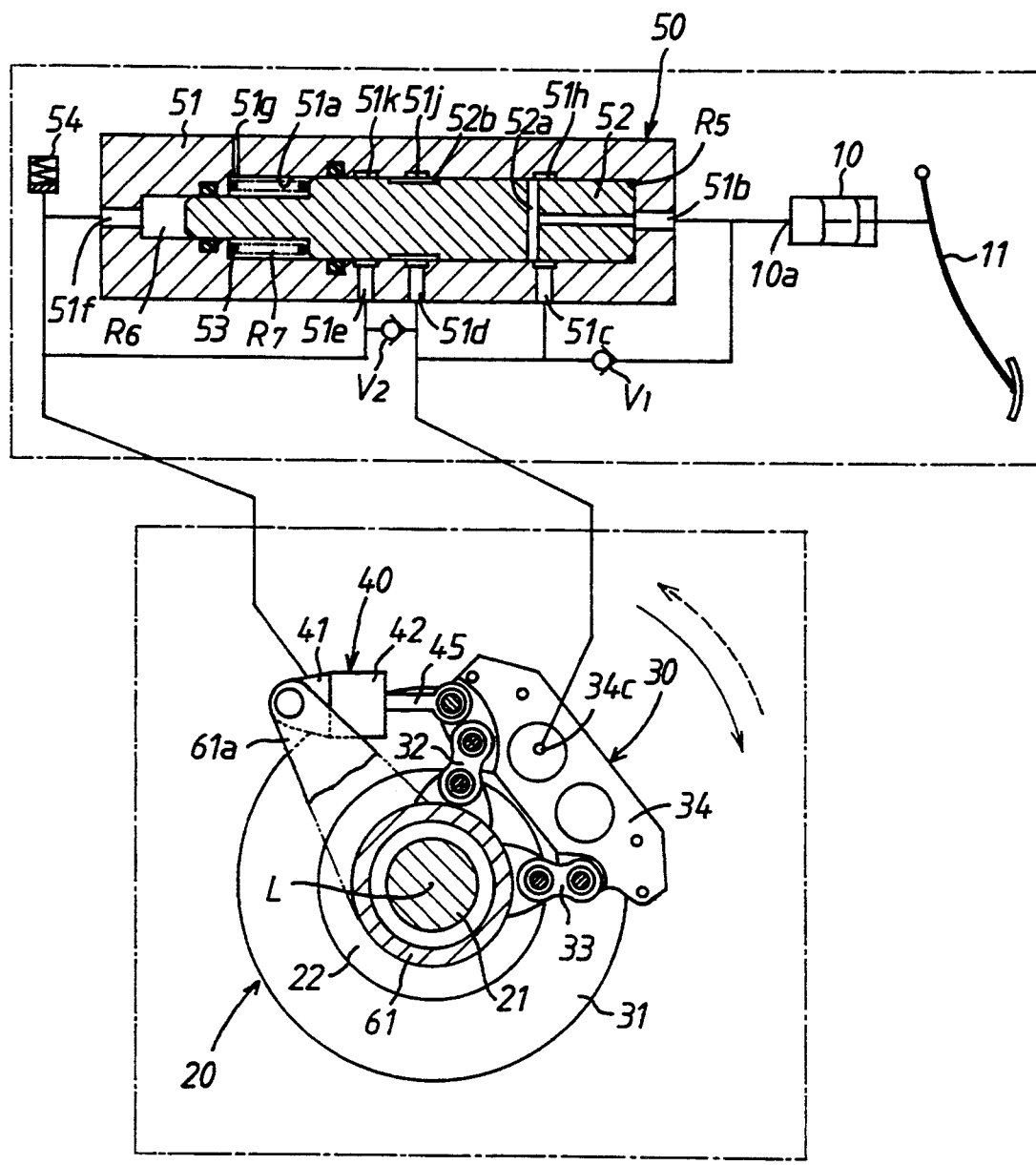
FIG. 1 is a schematic Illustration of a braking device for an automotive vehicle in accordance with the present invention.

In FIG. 1 of the drawings, there is schematically illustrated a braking device adapted to a non-driven front road wheel 20 of an automotive vehicle. The braking device includes a master cylinder 10 for producing master cylinder pressure Pm in accordance with a depression force applied to a brake pedal 11, a wheel brake assembly 30 arranged to be operated by hydraulic wheel cylinder pressure Pw applied thereto for applying a braking force to the front road wheel 20, a hydraulic servo-unit 40 for generating a servo-pressure Ps in accordance with the braking force applied to the front road wheel 20, and a hydraulic control device 50 for controlling the wheel cylinder pressure Pw in accordance with the servo-pressure Ps exerted in the servo unit 40. In addition, the front road wheel 20 has a spindle 21 rotatably supported within a steering knuckle 61, an axle hub 22 united with the spindle 21 and a tire wheel (not shown) mounted on the axle hub 22 to be rotated about an axis L.

Figure 2:
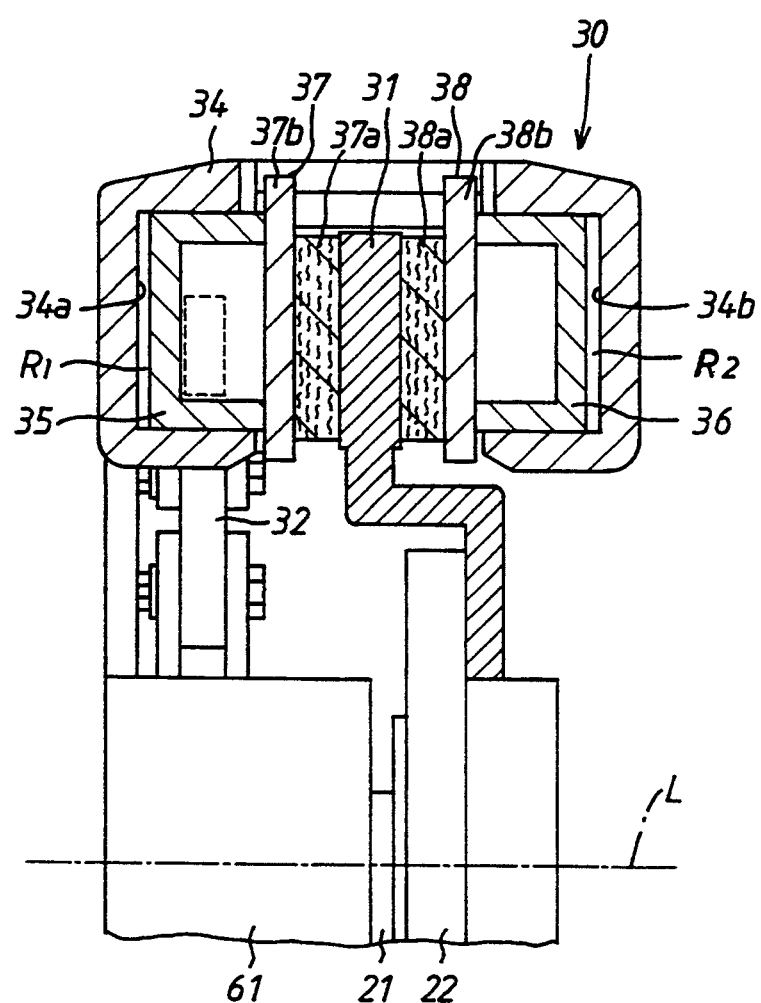
FIG. 2 is an enlarged sectional view of a wheel brake assembly shown in FIG. 1.

As shown in FIGS. 1 and 2, the wheel brake assembly 30 includes a rotary brake disc 31 mounted on the axle hub 22, a caliper member 34 of the opposed type formed to straddle the rotary brake disc 31 and mounted on the steering knuckle 61 by means of a pair of radial links 32, 33 to be moved in a circumferential direction of the rotary brake disc 31, a pair of opposed pistons 35, 36 slidably disposed within a pair of opposed cylinders 34a, 34b in the caliper member 34 to form a pair of fluid chambers R1, R2, and a pair of opposed brake shoes 37 and 38 carried on the caliper member 34 to be axially moved toward and away from the rotary brake disc 31. The inner brake shoe 37 has a lining pad 37a secured to a backing plate 37, while the outer brake shoe 38 has a lining pad 38a secured to a backing plate 38b. The inner and outer brake shoes 37 and 38 are axially movably assembled with the caliper member 34 at their backing plates 37b, 38b, respectively. In the wheel brake assembly 30, the caliper member 34 is provided with an inlet port 34c in communication with the fluid chambers R1 and R2, When the fluid chambers R1 and R2 are supplied with hydraulic wheel cylinder pressure Pw through the inlet port 34c, the pistons 35 and 36 are moved toward the rotary brake disc 31 to press the lining pads 37a, 38a of brake shoes 37, 38 into contact with the rotary brake disc 31.

Figure 3A:
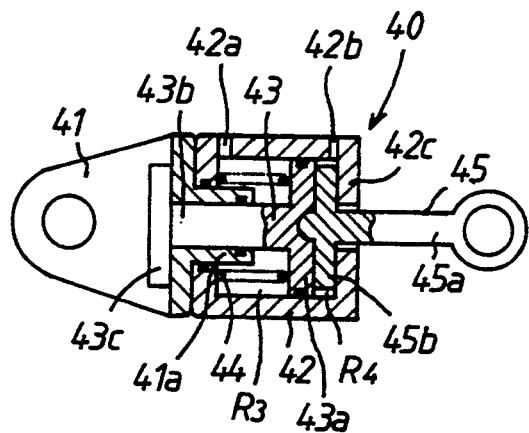
FIGS. 3(A) 3(B) and 3(C) illustrate the mode of operation of a hydraulic servo unit shown in FIG. 1, in an enlarged scale.

As shown in FIGS. 1 and 3(A), the hydraulic servo unit 40 is arranged between a radial arm 61a integral with the steering knuckle 61 and one end of the caliper member 34. The hydraulic servo unit 40 includes a yoke member 41, a cylinder housing 42, a piston-rod 43, a spring 44 and a connecting rod 45. The yoke member 41 is formed with a cylindrical support portion 41a and swingably connected to the distal end of radial arm 61a. The cylinder housing 42 is formed with an outlet port 42a and a vent port 42b and slidably coupled with the cylindrical support portion 41a of yoke member 41 in a liquid-night manner. The piston-rod 43 has a piston part 43a united with a rod part 43b and formed at its outer end with a flange part 43c. The piston part 43a is slidably disposed within the cylinder housing 42 to form a servo chamber R3 in open communication with the outlet port 42a and an air chamber R4 in open communication with the vent port 42b. The rod part 43b is slidably disposed within the cylindrical support portion 41a of yoke member 41 in a liquid-tight manner, and the flange part 43c is engaged with an end face of yoke member 41. The spring 44 is disposed within the servo chamber R3 to bias the piston-rod 43 toward the air chamber R4. The connecting rod 45 has a rod part 45a formed at its one end with a flange part 45b which is contained within the air chamber R4 to be engaged with an end wall 42c of cylinder housing 42 and the piston part 43a of piston-rod 43. The rod part of connecting rod 45 is swingably connected at its other end to the caliper member 34.

Figure 3B:
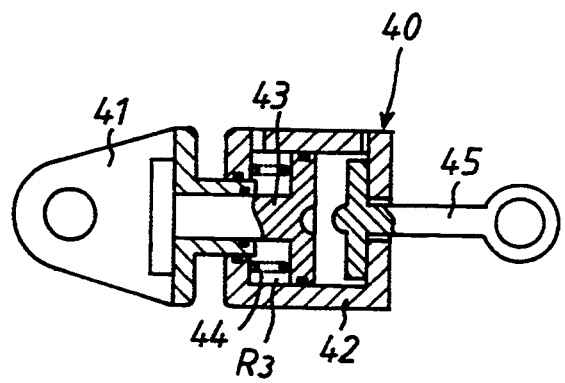
Figure 3C:
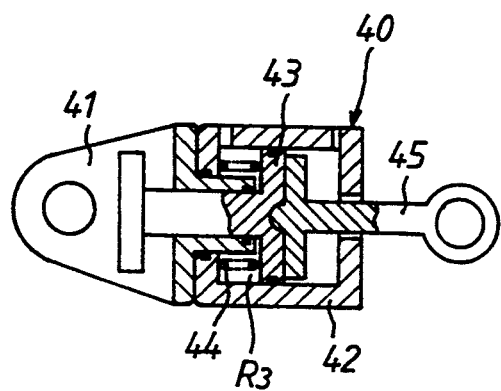

Assuming that the front road wheel 20 rotates in a forward direction shown by a solid arrow in FIG. 1 in braking operation of the vehicle, the connecting rod 45 and cylinder housing 42 are moved against the biasing force of spring 44 as shown In FIG. 3(B) to generate a servo-pressure Ps in chamber R3 in accordance with a braking force applied to the rotary brake disc 31. When the front road wheel 20 rotates in a reverse direction shown by a dotted arrow in FIG. 1 in braking operation of the vehicle, the connecting rod 45 and piston-rod 43 are moved against the biasing force of spring 44 as shown in FIG. 3(C) to generate a servo-pressure Ps in chamber R3 in accordance with a braking force applied to the rotary brake disc 31.

As shown in FIG. 1, the hydraulic control device 50 includes a cylinder housing 51, a stepped piston 52 and a spring 53. The cylinder housing 51 is formed with a stepped bore 51a, five ports 51b–51f, a vent port 51g and three axially spaced annular grooves 51h, 51J, 51K. The cylinder housing 51 is connected at its port 51b to an outlet port 10a of the master cylinder 10 and connected at its ports 51e, 51d to the inlet port 34c of caliper member 34 and to the outlet port 10a of master cylinder 10 through a check valve $V_1$. The cylinder housing 51 is further connected at its ports 51e, 51f to the outlet port 42a of servo unit 40 and an accumulator 54 and to the ports 51c, 51d through a check valve $V_2$.

The stepped piston 52 is slidably disposed within the stepped bore 51a in a liquid-tight manner to form fluid chambers R5 and R6 respectively at its large and small diameter portions and to form an annular air chamber R7 in open communication with the vent port 51g at its stepped portion. The right-hand fluid chamber R5 is in open communication with the port 51b to be applied with the master cylinder pressure Pm, while the left-hand fluid chamber R6 is in open communication with the port 51f to be applied with the servo-pressure Ps. The spring 53 is disposed within the air chamber R7 to bias the stepped piston 52 toward the right-hand fluid chamber R5. The large diameter portion of stepped piston 52 is formed with a communication passage 52a and an annular groove 52b. When the stepped piston 52 is placed in an original position as shown in FIG. 1, the port 51b is communicated with the port 51c through the communication passage 52a and annular groove 51b.

Figure 4A:
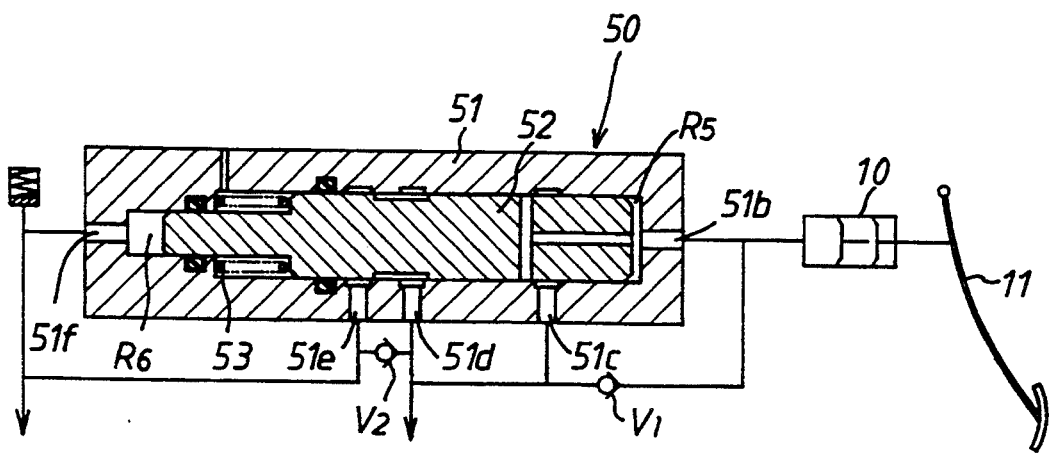
FIGS. 4(A) and 4(B) illustrate the mode of operation of a hydraulic control device shown in FIG. 1.
Figure 4B:
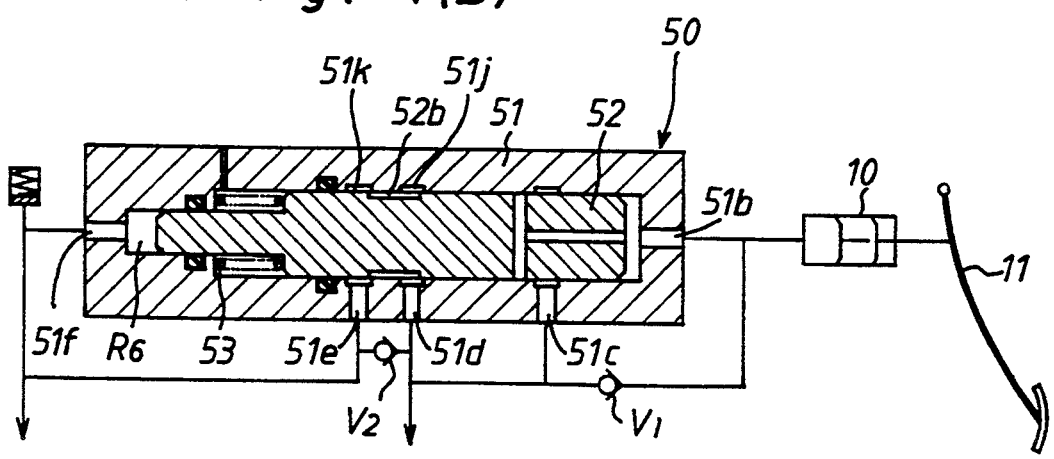

When the stepped piston 52 is displaced as shown in FIG. 4(A), the communication between ports 51b and 51c is interrupted by the stepped piston 52. When the stepped piston 52 is displaced as shown in FIG. 4(B), the annular groove 52b of piston 52 is overlapped with the annular grooves 51j and 51k to establish a fluid communication between the ports 51d and 51c therethrough for applying the servo-pressure Ps to the wheel cylinder pressure Pw.

Assuming that the brake pedal 11 has been depressed to actuate the master cylinder 10, hydraulic master cylinder pressure Pm exerted in the master cylinder 10 is applied to the inlet port 34c of wheel brake assembly 30 through the ports 51b, 51c of control device 50 and the check valve $V_1$. In such an initial stage of the braking operation, the hydraulic master cylinder pressure Pm is further applied to the inlet port 42a of servo unit 40 and the port 51f of control valve 50 through the check valve $V_2$. Thus, the pistons 35 and 36 of wheel brake assembly 80 are moved inwardly by the master cylinder pressure Pm applied thereto to press the brake shoes 37 and 38 into contact with the opposite faces or rotary brake disc 31 for braking the front road wheel 20. When applied with a braking force caused by frictional engagement with the brake shoes 37 and 38, the rotary brake disc 31 causes the caliper member 34 to move against the biasing force of spring 44 of servo unit 40. This causes the servo unit 40 to generate a servo-pressure Ps in accordance with the braking force applied to the rotary brake disc 31. In this instance, the stepped piston 52 of control device 50 is displaced by the master cylinder pressure Pm applied to its large diameter portion against the biasing force of spring 53 and the servo-pressure Ps applied to its small diameter portion.

When the servo-pressure Ps increases in a predetermined relationship with an increase of tile braking force, the stepped piston 52 is balanced at a position shown in FIG. 4(A) to interrupt the fluid communication between the ports 51b and 51c and between the ports 51d and 51e. Thus, the braking force acting on the rotary brake disc 31 is controlled by the master cylinder pressure Pm in a usual manner. If in such braking operation the dynamic frictional coefficient of the lining pads 37a, 38a decreases due to an error in manufacturing process of lining pads 37a, 38a or rise of the temperature of the wheel brake assembly 30, the braking force will decrease to less than that in a normal condition of lining pads 37a, 38a. In this instance, the servo-pressure Ps becomes lower than that in the normal braking operation, As a result, the stepped piston 52 is balanced at a position shown in FIG. 4(B) to permit the fluid communication between the ports 51d and 51e. Thus, the wheel cylinder pressure Pw is increased by the servo-pressure Ps applied thereto to increase the braking force applied to the rotary brake disc 31. This causes the servo-pressure Ps to increase in the predetermined relationship with the increase of the wheel cylinder pressure Pw. Consequently, the stepped piston 52 will be balanced at a position shown in FIG. 4(A) to interrupt the fluid communication between the ports 51b and 51c and between the ports 51d and 51c. If in such an instance the wheel cylinder pressure Pw is excessively increased by the servo-pressure Ps, the stepped piston 52 is displaced to position shown in FIG. 1 to permit the fluid communication between the ports 51b and 51c thereby to release the excessive pressure toward the master cylinder 10.

Assuming that the vehicle passes over a projection or recess on the travel road during the braking operation, the braking force applied to the rotary brake disc 31 during rotation of the front road wheel is maintained at the controlled value without any change since the dynamic frictional coefficient of lining pads 37a, 38a is maintained at a constant value even when the grounding load of the front wheel tire is decreased in a moment. For this reason, the braking force Is maintained in the predetermined relationship with the master cylinder pressure Pm. This is effective to reliably ensure the braking force applied to the front road wheel after the vehicle has been grounded.

What is claimed is:

1. A braking device for an automotive vehicle having a master cylinder to be operated by depression of a brake pedal for producing master cylinder pressure and a wheel brake assembly movably mounted to a road wheel to be operated by the master cylinder pressure applied thereto for applying a braking force to the road wheel in accordance with the depression force of the brake pedal, comprising:
    a hydraulic servo unit mounted on an axle housing of the road wheel and operatively connected to said wheel brake assembly for generating a servo-pressure in a first predetermined relationship with the braking force in response to movement of said wheel brake assembly; and
    a hydraulic control device arranged to apply the servo-pressure to said wheel brake assembly when increasing master cylinder pressure exceeds a second predetermined relationship with increasing servo-pressure.

2. A braking device as recited in claim 1, wherein said hydraulic control device comprises means for applying the master cylinder pressure to said wheel brake assembly therethrough in response to depression of said brake pedal and means for applying the servo-pressure to said wheel brake assembly when increasing master cylinder pressure exceeds said second predetermined relationship with the servo-pressure.

3. A braking device as recited in claim 1, wherein said hydraulic control device comprises a housing formed with a stepped bore and first and second ports respectively in connection to said master cylinder and said servo unit, said housing being further formed with third and fourth pores connected to one another and in connection to said wheel brake assembly and a fifth port in connection to said servo unit; a stepped piston having a large diameter portion slidable in a large diameter portion of said stepped bore and a small diameter portion slidably in a small diameter portion of said stepped bore and formed with a communication passage for communication with the first and third ports of said housing; and resilient means for biasing said stepped piston toward the first port of said housing; wherein a first check valve is disposed within a conduit connecting said master cylinder to the third port of said housing to permit fluid under pressure supplied to said wheel brake assembly from said master cylinder there-through, and a second check valve disposed within a conduit connecting the fourth port to the fifth port of said housing, and wherein said stepped piston is displaced against a predetermined biasing force or said resilient means to establish a fluid communication between the fourth and fifth ports of said housing when the servo-pressure decreases less than that in the predetermined relationship with the master cylinder pressure.

4. A braking device comprising:
    a master cylinder producing master cylinder pressure proportional to the amount of depression of a brake pedal;
    a wheel brake assembly movably mounted to a wheel and applying braking force to said wheel in response to master cylinder pressure, wherein the braking force is proportional to the master cylinder pressure and causes said wheel brake assembly to move;
    a hydraulic servo unit operatively connected to said wheel brake assembly and producing a servo pressure in a first predetermined relationship with the braking force, said servo pressure having a second predetermined relationship with master cylinder pressure; and
    a hydraulic control device applying said servo pressure to said wheel brake assembly when increasing master cylinder pressure exceeds the second predetermined relationship with increasing servo pressure.

5. A braking device according to claim 4, wherein said hydraulic control device further comprises means for applying master cylinder pressure to said wheel brake assembly therethrough.

6. A braking device according to claim 4, further comprising means for applying the servo pressure to said wheel brake assembly when increasing master cylinder pressure exceeds the second predetermined relationship with increasing servo pressure.

7. A braking device as claimed in claim 6, further comprising means for releasing excess braking pressure to said master cylinder when a decrease in master cylinder pressure decreases more than a third proportional relationship to decreasing servo pressure.

8. The braking device of claim 4, wherein the servo pressure is only applied to said wheel brake assembly when increasing master cylinder pressure exceeds said second predetermined relationship with increasing servo pressure.

9. A braking device comprising:
    a master cylinder producing master cylinder pressure proportional to the amount of depression of a brake pedal;
    a wheel brake assembly movably mounted to a wheel and applying braking force to said wheel in response to master cylinder pressure, wherein the braking force is proportional to the master cylinder pressure and said wheel brake assembly movement is proportional to the braking force;
    a hydraulic servo unit operatively connected to said wheel brake assembly and producing a servo pressure proportional to the amount of movement of said wheel brake assembly, the servo pressure being greater than the master cylinder pressure and the master cylinder pressure being a first predetermined fraction of the servo pressure under normal braking conditions; and
    a hydraulic control device applying the servo pressure to said wheel brake assembly to increase the braking force when the master cylinder pressure exceeds the first predetermined fraction of the servo pressure.

10. A braking device according to claim 9, wherein said hydraulic servo unit produces servo pressure responsive to movement of said wheel brake assembly regardless of the direction of movement of said wheel brake assembly.

11. A braking device according to claim 9, wherein the servo pressure is not applied to said wheel brake assembly unless the servo pressure is less than said first multiple of the master cylinder pressure.

* * * * *